United States Patent
Bai et al.

(10) Patent No.: US 12,494,677 B2
(45) Date of Patent: Dec. 9, 2025

(54) SURVEY KEY VERIFICATION METHOD AND DEVICE FOR WIRELESS CHARGING, AND STORAGE MEDIUM

(71) Applicant: Beijing Xiaomi Mobile Software Co., Ltd., Beijing (CN)

(72) Inventors: Guanglei Bai, Beijing (CN); Jiawen Shi, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 226 days.

(21) Appl. No.: 18/184,252

(22) Filed: Mar. 15, 2023

(65) Prior Publication Data

US 2024/0146120 A1    May 2, 2024

(30) Foreign Application Priority Data

Nov. 1, 2022    (CN) .......................... 202211355819.0

(51) Int. Cl.
*H02J 50/80*    (2016.01)
*H02J 7/00*    (2006.01)
*H04W 12/062*    (2021.01)

(52) U.S. Cl.
CPC .......... *H02J 50/80* (2016.02); *H02J 7/00045* (2020.01); *H04W 12/062* (2021.01)

(58) Field of Classification Search
CPC .. G06F 21/44; G06F 21/88; G06F 2221/2129; H02J 50/80; H02J 50/00045; H04W 12/062; H04W 12/06; H04W 12/069; H04L 63/0823; H04L 63/0876
See application file for complete search history.

(56) References Cited

U.S. PATENT DOCUMENTS

| | | | | |
|---|---|---|---|---|
| 2005/0127868 A1* | 6/2005 | Calhoon | ................ | H02J 50/10 320/108 |
| 2009/0292918 A1* | 11/2009 | Mori | ..................... | H04L 9/0894 713/168 |
| 2013/0257365 A1* | 10/2013 | Redding | ............... | H02J 7/0071 320/108 |

(Continued)

FOREIGN PATENT DOCUMENTS

| | | | | |
|---|---|---|---|---|
| CN | 111585314 A | * | 8/2020 | ............. H02J 5/005 |
| EP | 2752964 A2 | * | 7/2014 | ............. H02J 50/10 |
| KR | 20200068555 A | * | 6/2020 | |

OTHER PUBLICATIONS

European Patent Office, Extended European Search Report issued in Application No. 23163712.5, dated Sep. 13, 2023, 14 pages.

*Primary Examiner* — Michael Simitoski
(74) *Attorney, Agent, or Firm* — Finnegan, Henderson, Farabow, Garrett & Dunner, L.L.P.

(57) ABSTRACT

A security key verification method for wireless charging includes: acquiring a security key of a wireless charging device and synchronizing the security key to a processor of an apparatus to be charged; and in response to the wireless charging device sending a security key verification request to a wireless charging receiver of the apparatus to be charged, transmitting the security key verification request via pass-through from the wireless charging receiver to the processor of the apparatus to be charged, and verifying the security key between the processor of the apparatus to be charged and the wireless charging device.

15 Claims, 11 Drawing Sheets

(56) References Cited

U.S. PATENT DOCUMENTS

| | | | | |
|---|---|---|---|---|
| 2014/0195803 A1* | 7/2014 | Knubben | H04W 12/06 | |
| | | | 713/168 | |
| 2014/0253021 A1* | 9/2014 | Luke | H04B 5/70 | |
| | | | 320/137 | |
| 2015/0006395 A1* | 1/2015 | Chu | G06Q 20/40 | |
| | | | 705/44 | |
| 2015/0031334 A1* | 1/2015 | Wu | H02J 50/80 | |
| | | | 455/411 | |
| 2015/0244201 A1* | 8/2015 | Chu | H02J 50/80 | |
| | | | 320/108 | |
| 2016/0050563 A1* | 2/2016 | Bronk | H04L 63/062 | |
| | | | 726/7 | |
| 2016/0254691 A1* | 9/2016 | Koo | H02J 50/80 | |
| | | | 320/108 | |
| 2017/0193250 A1* | 7/2017 | Toya | G06F 21/44 | |
| 2018/0287414 A1* | 10/2018 | Teich | H02J 7/0042 | |
| 2019/0021001 A1* | 1/2019 | Park | H02J 50/70 | |
| 2019/0044393 A1* | 2/2019 | Louis | H04B 5/79 | |
| 2019/0245385 A1* | 8/2019 | Chandrakasan | H04L 9/0662 | |
| 2019/0312462 A1* | 10/2019 | Shichino | H02J 50/80 | |
| 2020/0195061 A1* | 6/2020 | Montero | H04L 9/0841 | |
| 2020/0266665 A1* | 8/2020 | Noh | H02J 7/00712 | |
| 2020/0266675 A1* | 8/2020 | Lee | H02J 50/10 | |
| 2020/0305716 A1* | 10/2020 | Mondello | A61B 5/6867 | |
| 2022/0102995 A1* | 3/2022 | Fieldbinder | H02J 7/00045 | |
| 2022/0116776 A1* | 4/2022 | Spangler | H04L 63/08 | |
| 2022/0263819 A1* | 8/2022 | Kim | H02J 7/00045 | |
| 2022/0346032 A1* | 10/2022 | Park | H04B 5/266 | |
| 2024/0097492 A1* | 3/2024 | Kimura | H02J 50/402 | |
| 2025/0047145 A1* | 2/2025 | Xu | H02J 7/00034 | |

\* cited by examiner

SURVEY KEY VERIFICATION METHOD AND DEVICE FOR WIRELESS CHARGING, AND STORAGE MEDIUM

CROSS-REFERENCE TO RELATED APPLICATION

This application is based on and claims priority to Chinese Patent Application No. 202211355819.0 filed on Nov. 1, 2022, the entire content of which is incorporated herein by reference for all purposes.

TECHNICAL FIELD

The present disclosure relates to the field of wireless charging security key verification, and more particularly to a security key verification method for wireless charging, a security key verification device for wireless charging, and a storage medium.

BACKGROUND

With the continuous development of smart phone charging technology, wireless charging has become a standard configuration of mobile terminals. During a wireless charging process, a security key as a verification method is adopted for authentication of a mobile terminal and a wireless charging base. Loading power negotiation and the wireless charging will be carried out after verification.

In related art, a unique security key is used for verification during the authentication of the mobile terminal and the wireless charging base. The security key verification process takes place inside firmware, and the security key is kept by a special person, with a high level of confidentiality.

However, it is necessary to provide the unique security key for suppliers during cooperation with suppliers (including wireless charger chip suppliers and wireless charging receiver chip suppliers). Once the security key is leaked, there is a great risk and it is not easy to manage.

SUMMARY

According to a first aspect of the present disclosure, a security key verification method for wireless charging is provided. The security key verification method is applied to an apparatus to be charged. The security key verification method includes: acquiring a security key of a wireless charging device and synchronizing the security key to the processor of the apparatus to be charged; and in response to the wireless charging device sending a security key verification request to a wireless charging receiver of the apparatus to be charged, transmitting the security key verification request via pass-through from the wireless charging receiver to the processor of the apparatus to be charged, and verifying the security key between the processor of the apparatus to be charged and the wireless charging device.

According to a second aspect of the present disclosure, a security key verification device for wireless charging is provided. The security key verification device for wireless charging includes: a processor; and a memory configured to store an instruction executable by the processor. The processor is configured to: acquire a security key of a wireless charging device and synchronizing the security key to the processor of the apparatus to be charged; and in response to the wireless charging device sending a security key verification request to a wireless charging receiver of the apparatus to be charged, transmit the security key verification request via pass-through from the wireless charging receiver to the processor of the apparatus to be charged, and verify the security key between the processor of the apparatus to be charged and the wireless charging device.

According to embodiments of a third aspect of the present disclosure, a non-transitory computer-readable storage medium is provided. An instruction is stored in the storage medium, and when the instruction is executed by a processor of a terminal, the processor of the terminal implements a security key verification method. The security key verification method includes: acquiring a security key of a wireless charging device and synchronizing the security key to the processor of the apparatus to be charged; and in response to the wireless charging device sending a security key verification request to a wireless charging receiver of the apparatus to be charged, transmitting the security key verification request via pass-through from the wireless charging receiver to the processor of the apparatus to be charged, and verifying the security key between the processor of the apparatus to be charged and the wireless charging device.

BRIEF DESCRIPTION OF DRAWINGS

The accompanying drawings, which are incorporated into and constitute a part of this specification, illustrate embodiments consistent with the present disclosure and, together with the specification, serve to explain the principles of the present disclosure rather than limit the present disclosure improperly.

DETAILED DESCRIPTION

Embodiments of the present disclosure will be described in detail and examples thereof will be shown in drawings. In terms of the description involving the drawings, unless otherwise indicated, the same numbers in different drawings represent the same or similar elements. Implementations described in the exemplary embodiments do not represent all implementations consistent with the present disclosure.

In the accompanying drawings, the same or similar designations throughout represent the same or similar elements or elements with the same or similar functions. The described embodiments are part of the embodiments of the present disclosure, not all of them. The embodiments described below with reference to the accompanying drawings are exemplary and are intended to explain the present disclosure, but cannot be understood as limiting the present disclosure. Based on the embodiments in the present disclosure, all other embodiments obtained by ordinary technicians in the art without creative work fall within the scope of protection of the present disclosure. The embodiments of the present disclosure will be described in detail with the accompanying drawings.

Figure 1:
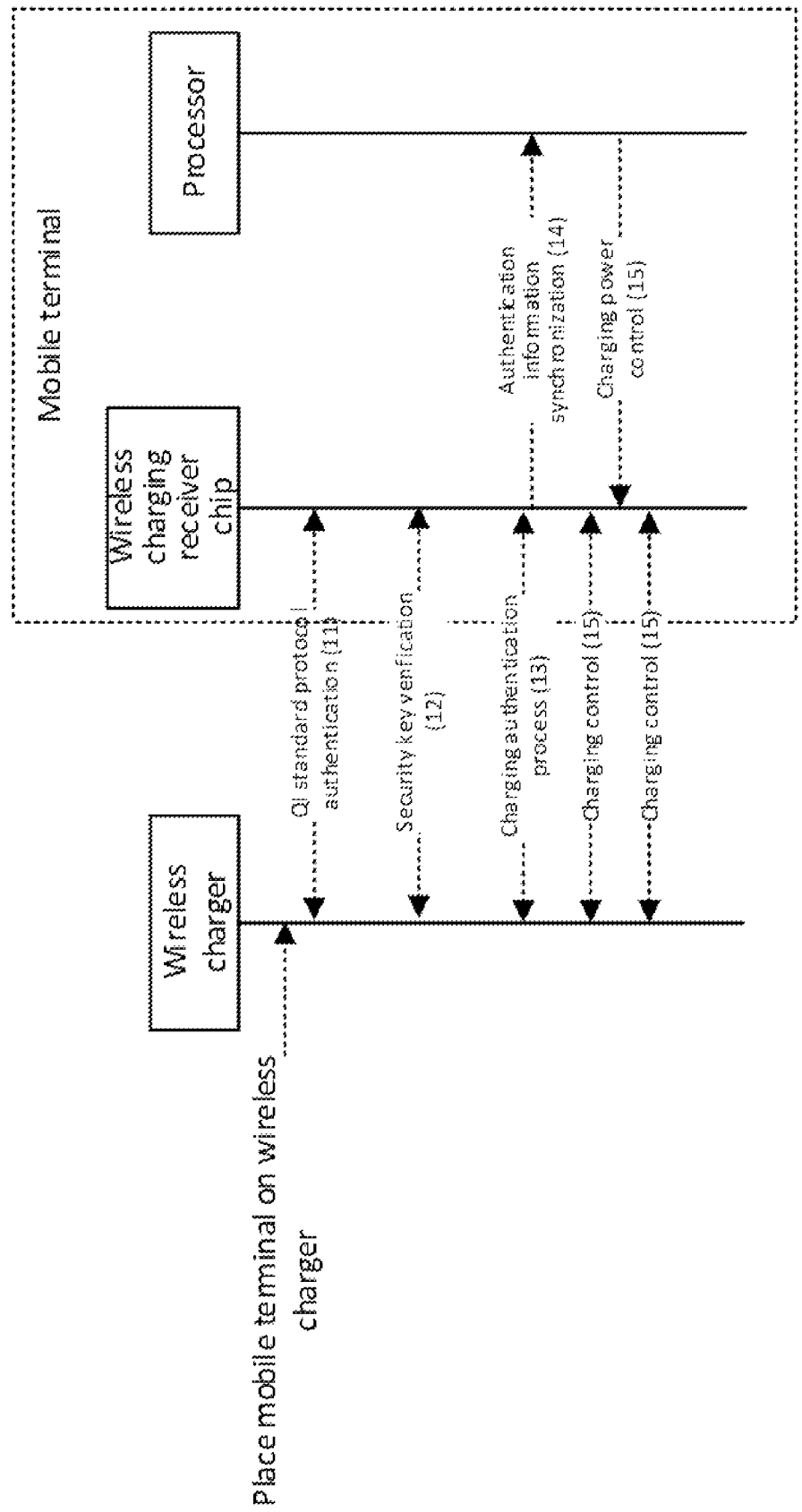
FIG. 1 is a flowchart of a verification method for wireless charging according to an embodiment of the present disclosure.
Figure 2:
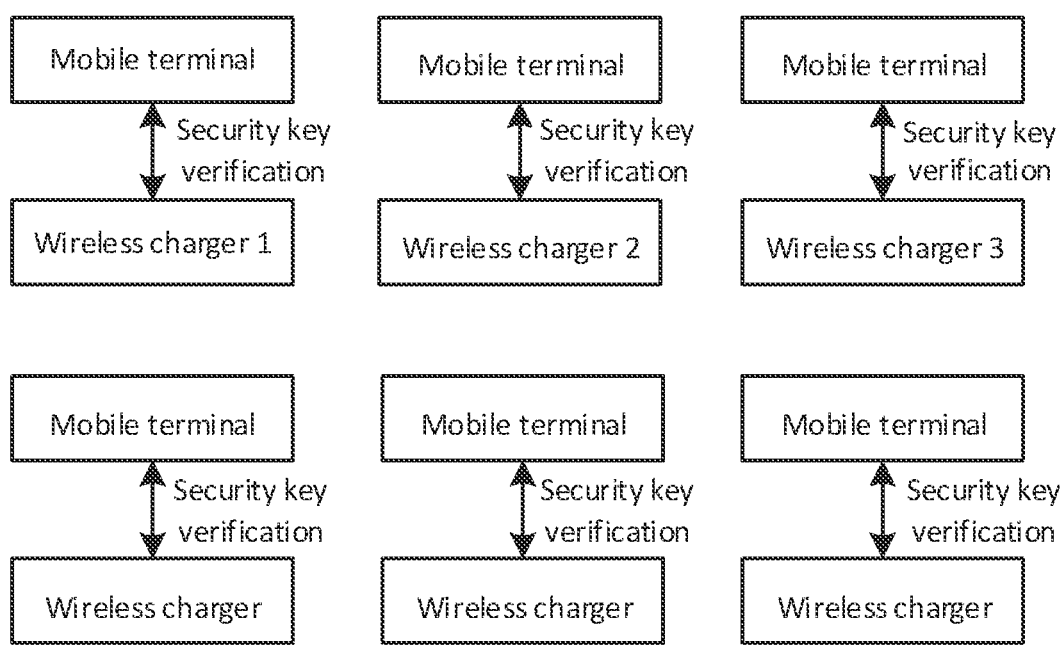
FIG. 2 is a schematic diagram of a security key verification method for wireless charging according to an embodiment of the present disclosure.

A security key verification method for wireless charging according to the present disclosure is applied to the field of wireless charging security key verification. With the development of wireless charging technology, wireless charging technology has been widely used in mobile terminals. FIG. 1 illustrates a wireless charging verification method according to an embodiment of the present disclosure. In a wireless charging process, after a mobile terminal is placed on a wireless charger, the mobile terminal and the wireless charger are authenticated for charging: QI standard protocol authentication is performed between the wireless charger and a wireless charging receiver chip (11); security key verification is performed between the wireless charger and a wireless charging receiver chip (12); a standard charging authentication process is carried out between the wireless charger and the wireless charging receiver chip (13); authentication information is synchronized between a wireless charging receiver and a processor chip (14); the mobile terminal is charged by the wireless charger, and a mobile phone processor controls a charging power by controlling a wireless charger chip (15). The security key verification process takes place inside firmware, i.e., between the wireless charger and the wireless charging receiver chip. FIG. 2 illustrates a schematic diagram of a security key verification method for wireless charging according to an embodiment of the present disclosure. Since the wireless charger (e.g., wireless charger 1, 2, or 3) needs to adapt to various mobile terminals that support wireless charging, the wireless charger produced by the same supplier can complete security key verification for different types of mobile terminals. Mobile terminals supporting wireless charging need to adapt to a variety of wireless chargers, and mobile terminals of the same model are targeted at wireless chargers produced by different suppliers. That is, the security key for wireless charging security key verification between mobile terminals and wireless chargers needs to be universal. Consequently, wireless chargers and wireless charging receiver chips produced by different suppliers all use a unique security key. Since the security key is set in the firmware, the security key cannot be modified after mass production. Although the security key is kept by a special person, with a high level of confidentiality, it is necessary to provide the security key for suppliers during cooperation with suppliers (including wireless charger chip suppliers and wireless charging receiver chip suppliers), which results in a great risk. Moreover, since the security key set in the firmware cannot be modified after products are sold, once the security key is leaked, serious losses may be caused.

Figure 3:
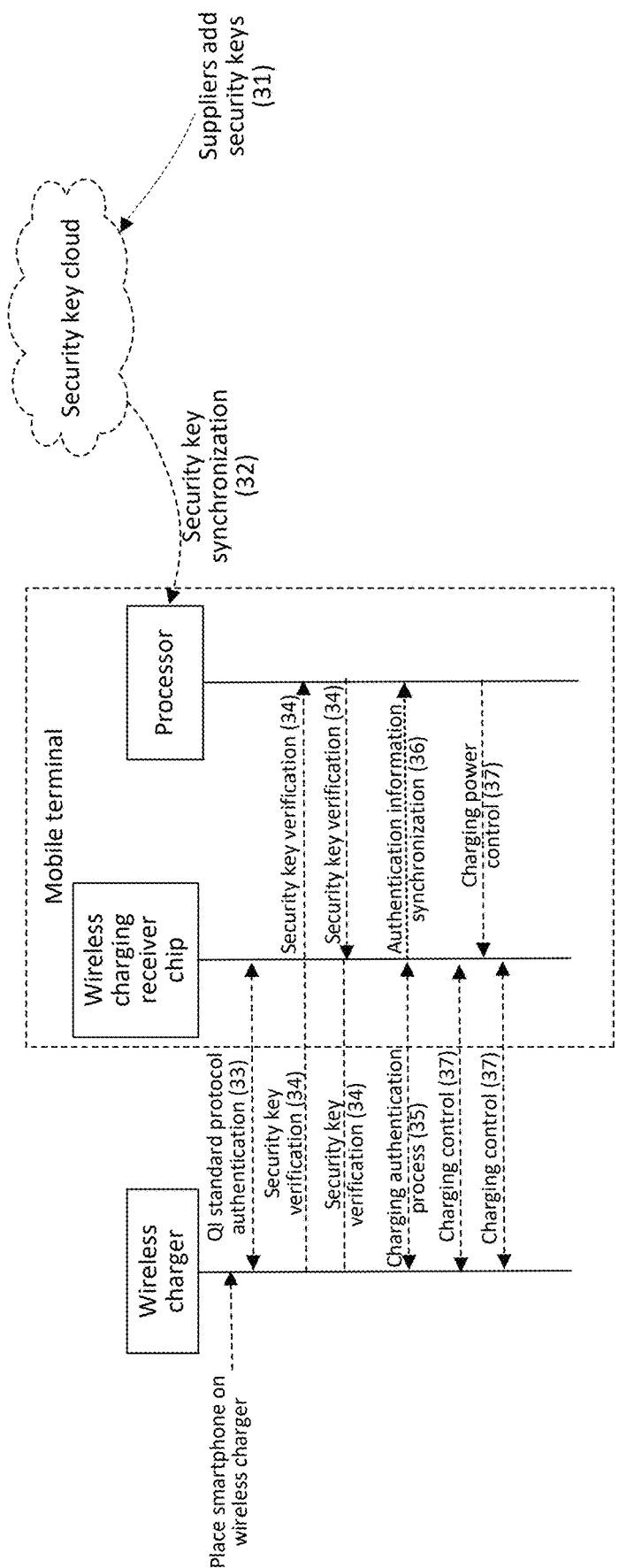
FIG. 3 is a flowchart of a verification method for wireless charging according to an embodiment of the present disclosure.

In view of the above facts, the present disclosure provides a security key verification method for wireless charging. A security key is individually registered for each wireless charger chip supplier; the security key is synchronized to a processor of a mobile terminal using a cloud control manner; and a security key verification process originally inside firmware (i.e., between a wireless charger and a wireless charging receiver chip) is transferred to between the wireless charger and the processor. In an embodiment, as shown in a flowchart of a wireless charging verification method in FIG. 3, the supplier adds a new security key to the cloud (31); the security key is synchronized between the processor and the cloud (32); QI standard protocol authentication is performed between the wireless charger and the wireless charging receiver chip after the mobile terminal is placed on the wireless charger (33); security key verification is performed via pass-through through the wireless charging receiver chip between the wireless charger and a processor of an apparatus to be charged (34); a standard charging authentication process is carried out between the wireless charger and the wireless charging receiver chip (35); authentication information is synchronized between a wireless charging receiver and a processor chip (36); the mobile terminal is charged by the wireless charger, and a mobile phone processor controls a charging power by controlling a wireless charger chip (37). According to the present disclosure, the wireless charging receiver chip suppliers does not need to know the security key; the security key leakage from the wireless charger chip suppliers only affects the suppliers, which can be quickly controlled and handled; a security key system can be used to grade security keys of suppliers with different degrees of cooperation; and security key management is facilitated, and quick addition and deletion of new security keys is allowed.

Figure 4:
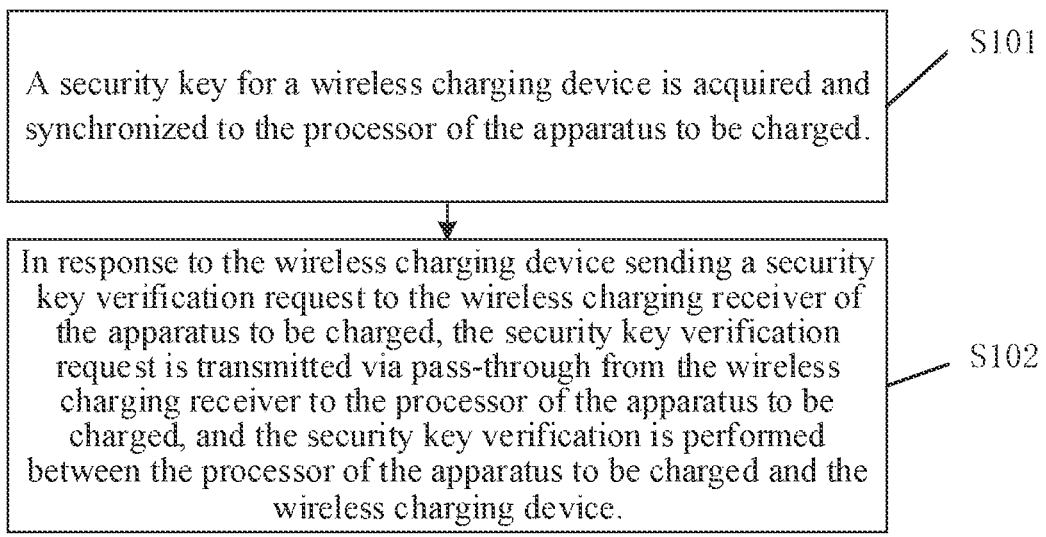
FIG. 4 is a flowchart of a security key verification method for wireless charging according to an embodiment of the present disclosure.

FIG. 4 is a flowchart of a security key verification method for wireless charging shown according to an embodiment of the present disclosure. As shown in FIG. 4, the method includes steps S101 to S102.

In step S101, a security key for a wireless charging device is acquired and synchronized to the processor of the apparatus to be charged.

In the embodiments of the present disclosure, there are many types of wireless charging devices, and different types of wireless charging devices are provided by different suppliers. Since the wireless charging devices provided by different suppliers have different security keys, a plurality security keys are synchronized by the processor of the apparatus to be charged and correspond to the wireless charging devices provided by all suppliers.

In step S102, in response to the wireless charging device sending a security key verification request to the wireless charging receiver of the apparatus to be charged, the security key verification request is transmitted via pass-through from the wireless charging receiver to the processor of the apparatus to be charged, and the security key verification is performed between the processor of the apparatus to be charged and the wireless charging device.

In the embodiment of the present disclosure, since the security keys of the apparatus to be charged are synchronized in the processor, the wireless charging receiver no longer sets any security key. The wireless charging receiver mainly performs QI standard protocol authentication and charging control in the whole charging process, and only transmits the security keys via pass-through in the security key verification process. The security key verification process mainly occurs between the wireless charging device and the processor of the apparatus to be charged.

In the embodiment of the present disclosure, the processor of the apparatus to be charged synchronizes the security key of the wireless charging device; after the security key verification request is received from the wireless charging device is received, the wireless charging receiver transmits the security key verification request via pass-through; and the wireless charging device and the processor of the apparatus to be charged perform the security key verification.

The following embodiments of the present disclosure further describe the wireless security key verification method in the above embodiments of the present disclosure.

Figure 5:
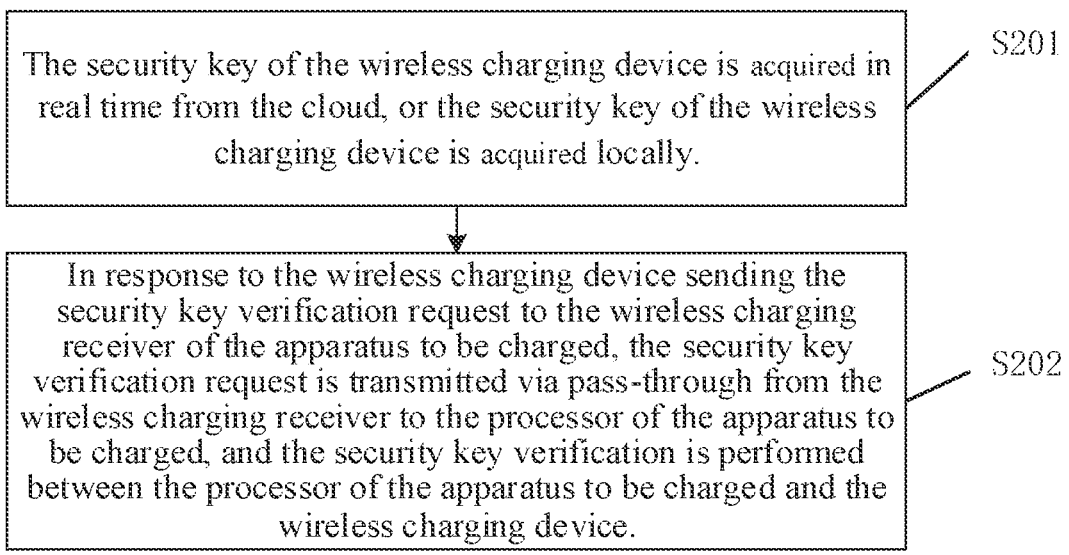
FIG. 5 is a flowchart of a security key verification method for wireless charging according to an embodiment of the present disclosure.

FIG. 5 is a flowchart of a security key verification method for wireless charging shown according to an embodiment of the present disclosure. As shown in FIG. 5, the method includes steps S201 to S202.

In step S201, the security key of the wireless charging device is acquired in real time from the cloud, or the security key of the wireless charging device is acquired locally.

In step S202, in response to the wireless charging device sending the security key verification request to the wireless charging receiver of the apparatus to be charged, the security key verification request is transmitted via pass-through from the wireless charging receiver to the processor of the apparatus to be charged, and the security key verification is performed between the processor of the apparatus to be charged and the wireless charging device.

The cloud stores security keys of different types of wireless charging devices, and the different types of wireless charging devices correspond to different security keys.

In the embodiment of the present disclosure, during verification of the security key for wireless charging, with network service, the apparatus to be charged can obtain the security key of the wireless charging device from the cloud or locally; in the absence of network service, the apparatus to be charged obtains the security key of the wireless charging device locally. The apparatus to be charged is synchronized with the cloud based on changes in the cloud, and addition or deletion is made to local security keys.

In the embodiment of the present disclosure, the apparatus to be charged obtains the security key of the wireless charging device from the cloud or locally; after the security key verification request from the wireless charging device is received, the wireless charging receiver transmits the security key verification request via pass-through; and the security key verification is performed between the wireless charging device and the processor of the apparatus to be charged.

The following embodiments of the present disclosure further describe the security key verification method for wireless charging in the above embodiments of the present disclosure.

Figure 6:
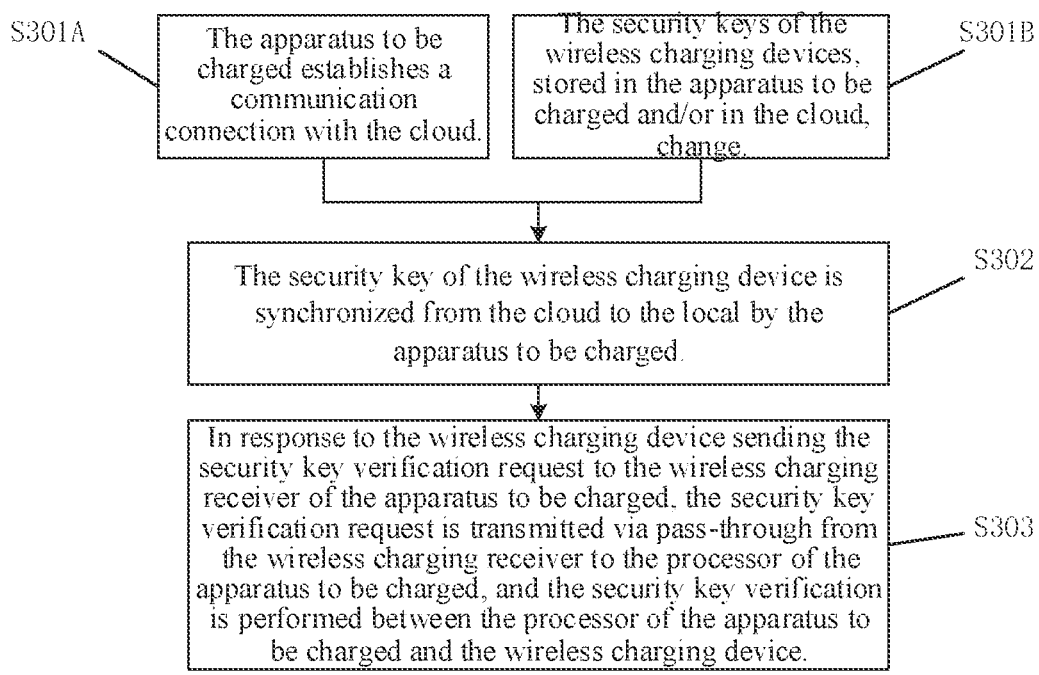
FIG. 6 is a flowchart of a security key verification method for wireless charging according to an embodiment of the present disclosure.

FIG. 6 is a flowchart of a security key verification method for wireless charging shown according to an embodiment of the present disclosure. As shown in FIG. 6, the method includes steps S301A to S303.

In step S301A, the apparatus to be charged establishes a communication connection with the cloud; in step S301B, the security keys of the wireless charging devices, which are stored in the apparatus to be charged and/or in the cloud, change.

In step S302, the security key of the wireless charging device is synchronized from the cloud to the local by the apparatus to be charged.

In step S303, in response to the wireless charging device sending the security key verification request to the wireless charging receiver of the apparatus to be charged, the security key verification request is transmitted via pass-through from the wireless charging receiver to the processor of the apparatus to be charged, and the security key verification is performed between the processor of the apparatus to be charged and the wireless charging device.

The change includes at least one of addition, deletion, or update.

In the embodiment of the present disclosure, after the supplier produces a new wireless charging device, a security key is set for the wireless charging device and is uploaded to the cloud, and the cloud adds a new security key. When the security key of a certain type of wireless chargers is leaked, the cloud responds quickly and deletes the corresponding security key, which reduces the scope of loss to the wireless charger supplier. After the security keys stored in the cloud change, the wireless charging devices synchronize with the cloud to make addition or deletion to the stored security keys.

In the embodiment of the present disclosure, when the apparatus to be charged is coupled to the cloud, the apparatus to be charged synchronizes the security key of the wireless charging device from the cloud after the security keys in the cloud and the apparatus to be charged change. After the security key verification request from the wireless charging device is received, the wireless charging receiver transmits the security key verification request via pass-through, and the security key verification is performed between the wireless charging device and the processor of the apparatus to be charged.

It can be understood that the security key verification method for wireless charging according to the present disclosure is changed from an interactive process between the wireless charger and the wireless charging receiver of the terminal in the related art to interactive verification between the wireless charger and the processor of the terminal, which is a scheme of wireless charging security key verification based on a new security key transmission command compared with a relatively traditional security key verification method for wireless charging.

The following embodiments of the present disclosure further describe the process of security key verification between the processor of the apparatus to be charged and the wireless charging device in the above embodiments of the present disclosure.

Figure 7:
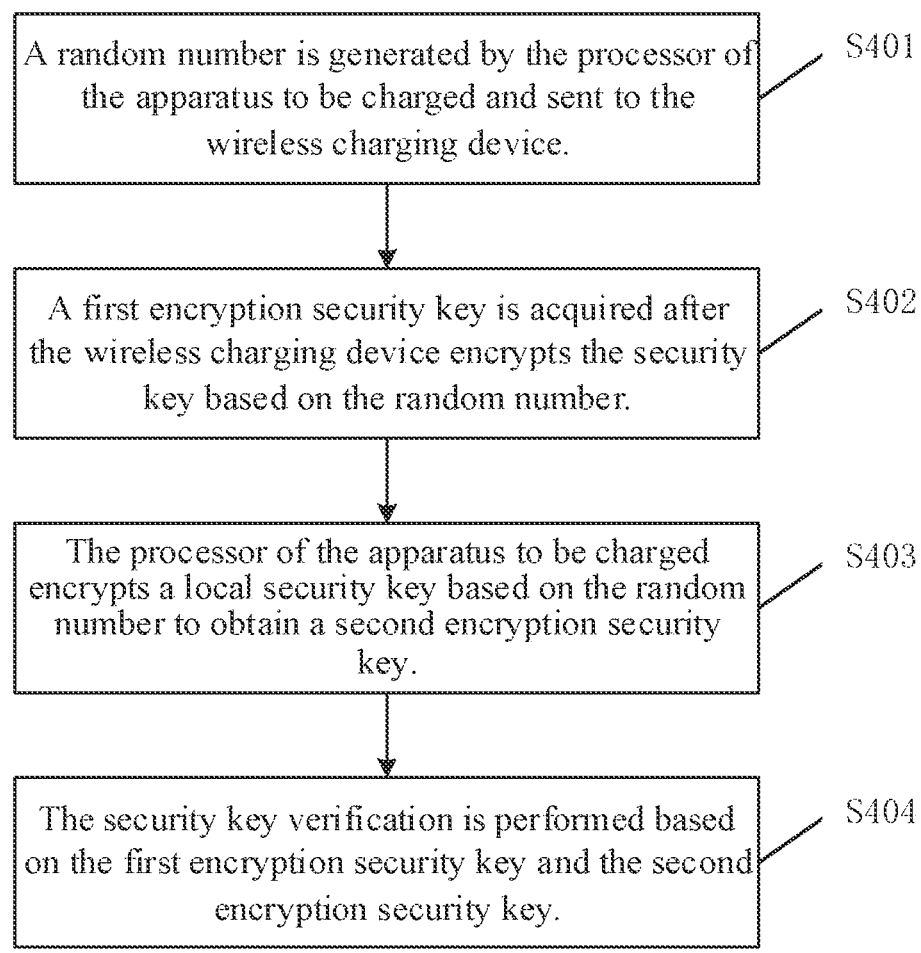
FIG. 7 is a flowchart of a security key verification method for wireless charging according to an embodiment of the present disclosure.

FIG. 7 is a flowchart of a security key verification method for wireless charging shown according to an embodiment of the present disclosure. As shown in FIG. 7, the method includes steps S401 to S404.

In step S401, a random number is generated by the processor of the apparatus to be charged and sent to the wireless charging device.

In step S402, a first encryption security key is acquired after the wireless charging device encrypts the security key based on the random number.

In step S403, the processor of the apparatus to be charged encrypts a local security key based on the random number to obtain a second encryption security key.

In step S404, the security key verification is performed based on the first encryption security key and the second encryption security key.

Figure 8:
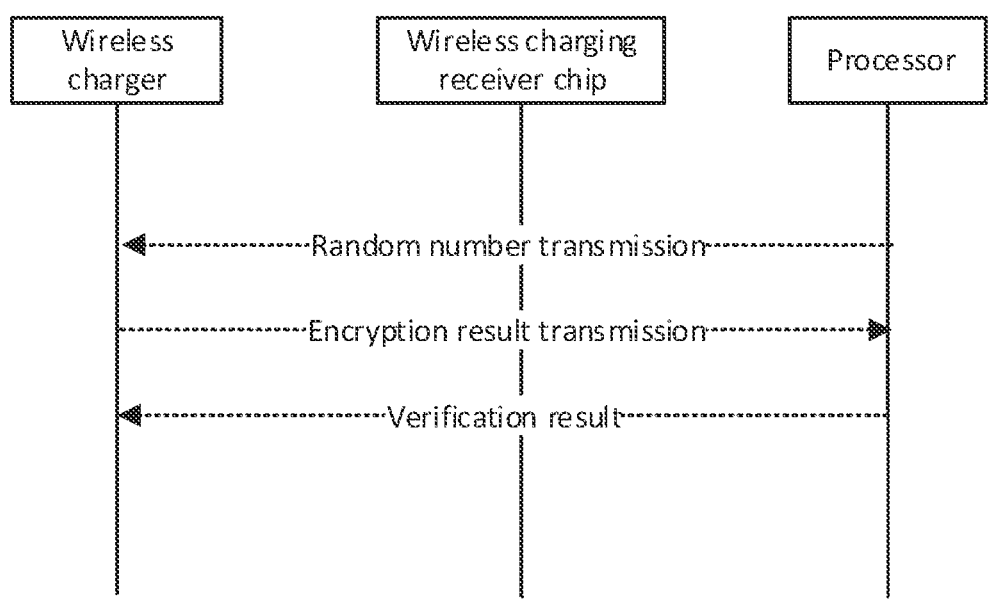
FIG. 8 is a flowchart of a security key verification method for wireless charging according to an embodiment of the present disclosure.

In the embodiment of the present disclosure, the apparatus to be charged and the wireless charging device use a random number method for security key verification. A flowchart of wireless charging security key verification is shown in FIG. 8. The apparatus to be charged generates a random number and sends it to the wireless charging device. The wireless charging device receives the random number and encrypts the random number with its own security key to obtain a first encryption security key. The apparatus to be charged uses a local security key to encrypt the random number to obtain a second encryption security key, and the second encryption security key matches with and is verified with the first encryption security key.

The following embodiments of the present disclosure further describe the security key verification method for wireless charging in the above embodiments of the present disclosure.

In one implementation, the apparatus to be charged locally stores a plurality of security keys of different types of wireless charging devices, which are synchronized from the cloud in advance; verifying the security key based on the first encryption security key and the second encryption security key includes: matching the first encryption security key with a plurality of second encryption security keys one by one, which are obtained by encrypting the local security keys of the apparatus to be charged based on the random number; and determining that the security key verification is successful if there is a second encryption security key that matches the first encryption security key.

Figure 9:
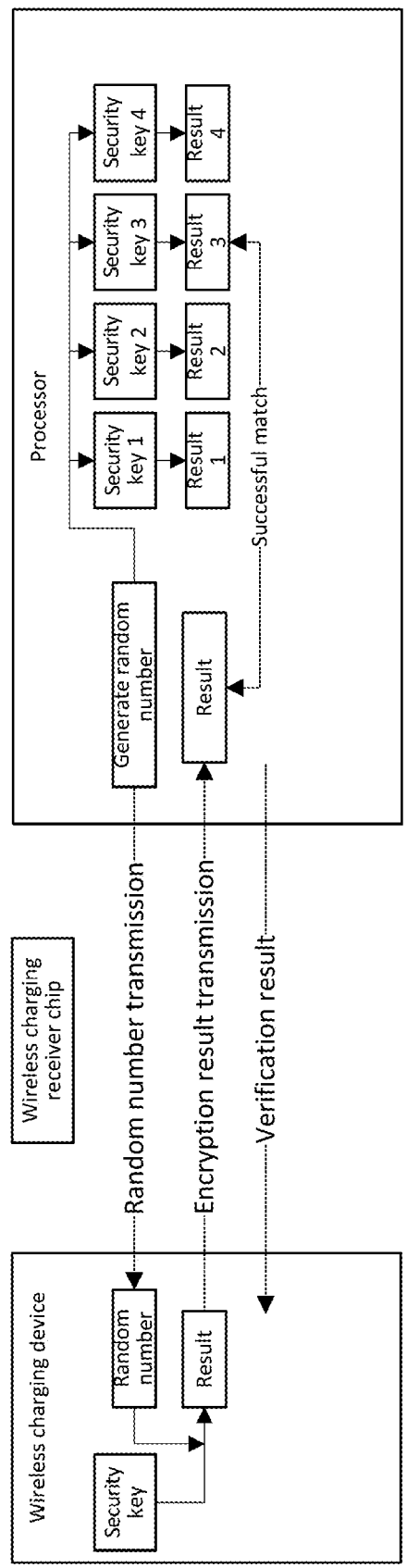
FIG. 9 is a flowchart of a security key verification method for wireless charging according to an embodiment of the present disclosure.

In the embodiment of the present disclosure, the first encryption security key matches with and is verified with the second encryption security key. Since there are a plurality of local security keys, there are a plurality of second encryption security keys obtained by encryption, and the number of the second encryption security keys is identical to the number of the local security keys. As shown in a schematic diagram of wireless charging security key verification in FIG. 9, the processor generates a random number; the random number is transmitted to the wireless charging device; and the random number is encrypted based on a plurality of local security keys (security key 1 to security key 4) to obtain a plurality of second encryption security keys (result 1 to result 4). After receiving the random number, the wireless charging device encrypts the random number with its own security key to obtain the second encryption security key and send the second encryption security key to the processor. The processor uses the plurality of second encryption security keys to match with the first encryption security key one by one until the match is successful. After the match is successful, the processor sends a verification result to the wireless charging device.

The following embodiments of the present disclosure further describe the security key verification method for wireless charging in the above embodiments of the present disclosure.

In one implementation, the security key verification method for wireless charging further includes: adding a grade label to the security key of the wireless charging device in response to the success of the security key verification. The security keys of different types of wireless charging devices correspond to different grade labels.

In the embodiment of the present disclosure, according to the cooperation relationship with the suppliers, the suppliers are graded, and different types of wireless chargers are also graded. Different levels of chargers support different charging power, and corresponding security keys are labeled with grades. After the wireless charging device completes the security key verification, the grade label of the security key corresponding to the first encryption security key which is successfully matched is obtained. Corresponding level of charging power is used for charging.

In the embodiment of the present disclosure, the supplier makes addition or deletion to the security keys in the cloud based on production of a new wireless charger or a security key leakage problem. The apparatus to be charged obtains a security key of the wireless charger through the cloud, synchronizes with the cloud based on the change of the security keys in the cloud, and makes addition or deletion to local security keys. When the apparatus to be charged is placed on the wireless charging device, the wireless charging device sends a security key verification request to the apparatus to be charged after completing QI protocol authentication. In response to the security key verification request, the apparatus to be charged generates a random number and transmits the random number to the wireless charger through the wireless charging receiver. After receiving the random number, the wireless charging receiver uses its own security key to encrypt the random number to obtain a first encryption security key. The processor of the apparatus to be charged uses local security keys to encrypt the random number to generate a plurality of second encryption security keys. The first encryption security key matches the plurality of second encryption security keys one by one until the match is successful, and at this time the security key verification is completed.

The technical solutions according to the embodiments of the present disclosure can have the following beneficial effects. The apparatus to be charged acquires the security key of the wireless charging device and synchronizes the security key to the processor; the apparatus to be charged receives the security key verification request from the wireless charging device; and the security key is verified between the processor and the wireless charging device via pass-through of the wireless charging receiver. The wireless charging receiver chip no longer needs to set up any security key, and the loss caused by leakage of the security key is reduced.

Based on the same idea, the embodiments of the present disclosure also provides a security key verification device for wireless charging.

It can be understood that, in order to realize the above functions, the security key verification device for wireless charging according to the embodiments of the present disclosure includes corresponding hardware structures and/or software modules to perform various functions. In combination with units and algorithm steps of examples disclosed in the embodiments of the present disclosure, the embodiments of the present disclosure can be realized in the form of hardware or the combination of hardware and computer software. Whether a function is implemented in the way of hardware or computer software driving hardware depends on specific applications and design constraints of technical solutions. Those skilled in the art can use different methods to implement the described functions for each specific application, and such implementation should not be considered beyond the scope of the technical solutions of the embodiments of the present disclosure.

Figure 10:
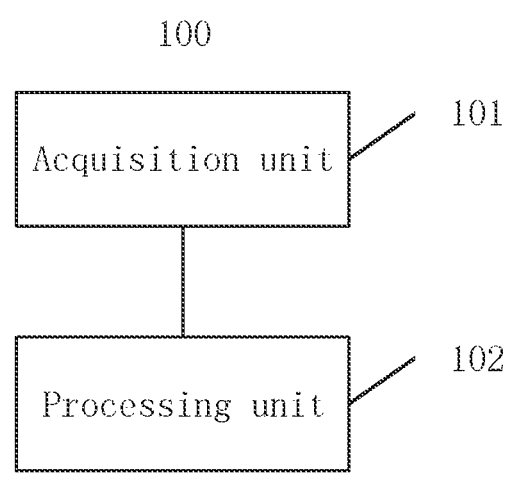
FIG. 10 is a block diagram of a security key verification device for wireless charging according to an embodiment of the present disclosure.

FIG. 10 is a block diagram of a security key verification device for wireless charging according to an embodiment of the present disclosure. Referring to FIG. 10, the device includes an acquisition unit 101 and a processing unit 102.

The acquisition unit 101 is configured to acquire a security key of a wireless charging device and synchronize the security key to a processor of an apparatus to be charged.

The processing unit 102 is configured to, in response to the wireless charging device sending a security key verification request to a wireless charging receiver of the apparatus to be charged, transmit the security key verification request via pass-through from the wireless charging receiver to the processor of the apparatus to be charged, and verify the security key between the processor of the apparatus to be charged and the wireless charging device.

In one implementation, the acquisition unit acquires the security key of the wireless charging device in the following way. That is, the security key of the wireless charging device is obtained in real time from cloud or is obtained locally; and the security key of the wireless charging device is synchronized from the cloud to the local by the apparatus to be charged when a synchronization condition is satisfied. The cloud stores security keys of different types of wireless charging devices, and different types of wireless charging devices correspond to different security keys.

In one implementation, the synchronization condition being satisfied includes at least one of: the apparatus to be charged establishing a communication connection with the cloud; or there being a change in the security keys of the wireless charging devices, which are stored in the apparatus to be charged and/or in the cloud, wherein the change includes at least one of addition, deletion, or update.

In one implementation, the processing unit verifies the security key between the processor of the apparatus to be charged and the wireless charging device in the following way: the processor of the apparatus to be charged generates a random number and sends the random number to the wireless charging device; a first encryption security key is obtained after the wireless charging device encrypts the security key based on the random number; the processor of the apparatus to be charged encrypts a local security key based on the random number to obtain a second encryption security key; the security key verification is performed based on the first encryption security key and the second encryption security key.

In one implementation, the apparatus to be charged locally stores a plurality of security keys of different types of wireless charging devices, which are synchronized from the cloud in advance; verifying the security key based on the first encryption security key and the second encryption security key includes: matching the first encryption security key with a plurality of second encryption security keys one by one, which are obtained by encrypting the local security keys of the apparatus to be charged based on the random number; determining that the security key verification is successful if there is a second encryption security key that matches the first encryption security key.

In one implementation, the processing unit is also used to add a grade label to the security key of the wireless charging device in response to the success of the security key verification. The security keys of different types of wireless charging devices correspond to different grade labels.

With regard to the device in the above embodiments, the specific mode of operation of each module has been described in detail in the embodiments of the method, which will not be described in detail here.

Figure 11:
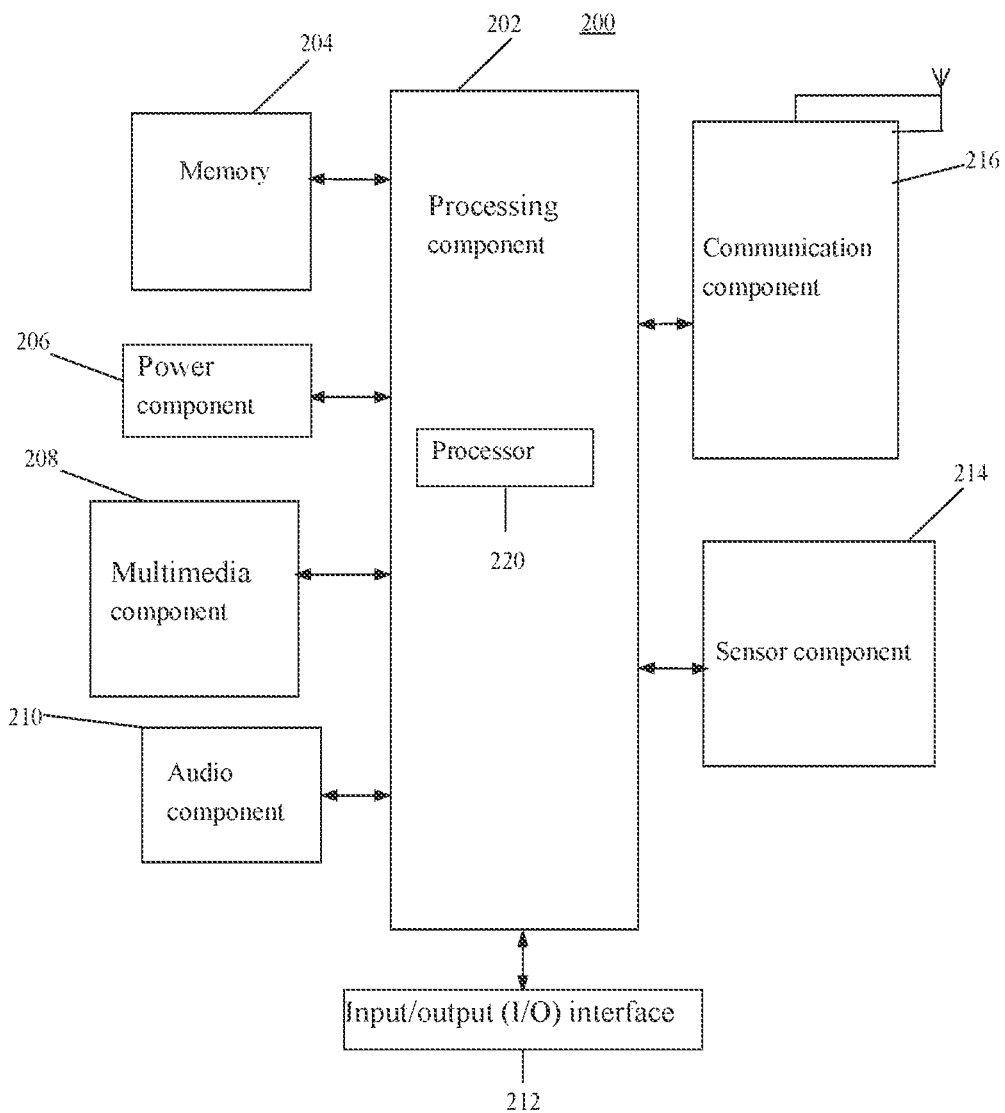
FIG. 11 is a block diagram of a security key verification device for wireless charging according to an embodiment of the present disclosure.

FIG. 11 is a block diagram of a wireless charging security key verification device 200 according to an embodiment of the present disclosure. For example, the device 200 may be a mobile phone, a computer, a digital broadcast terminal, a messaging device, a gaming console, a tablet, a medical device, exercise equipment, a personal digital assistant and the like.

Referring to FIG. 11, the device 200 may include one or more of the following components: a processing component 202, a memory 204, a power component 206, a multimedia component 208, an audio component 210, an Input/Output (I/O) interface 212, a sensor component 214, and a communication component 216.

The processing component 202 typically controls overall operations of the device 200, such as the operations associated with display, telephone calls, data communications, camera operations, and recording operations. The processing component 202 may include one or more processors 220 to execute instructions to perform all or part of the steps in the above described methods. Moreover, the processing component 202 may include one or more modules which facilitate the interaction between the processing component 202 and other components. For instance, the processing component 202 may include a multimedia module to facilitate the interaction between the multimedia component 208 and the processing component 202.

The memory 204 is configured to store various types of data to support the operation of the device 200. Examples of such data include instructions for any applications or methods operated on the device 200, contact data, phonebook data, messages, pictures, video, etc. The memory 204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the device 200. The power component 206 may include a power management system, one or more power sources, and any other components associated with the generation, management, and distribution of power in the device 200.

The multimedia component 208 includes a screen providing an output interface between the device 200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 208 includes a front camera and/or a rear camera. The front camera and the rear camera may receive an external multimedia datum while the device 200 is in an operation mode, such as a photographing mode or a video mode. Each of the front camera and the rear camera may be a fixed optical lens system or have focus and optical zoom capability.

The audio component 210 is configured to output and/or input audio signals. For example, the audio component 210 includes a microphone ("MIC") configured to receive an external audio signal when the device 200 is in an operation mode, such as a call mode, a recording mode, and a voice recognition mode. The received audio signal may be further stored in the memory 204 or transmitted via the communication component 216. In some embodiments, the audio component 210 further includes a speaker to output audio signals.

The I/O interface 212 provides an interface between the processing component 202 and peripheral interface modules, such as a security keyboard, a click wheel, buttons, and the like. The buttons may include, but are not limited to, a home button, a volume button, a starting button, and a locking button.

The sensor component 214 includes one or more sensors to provide status assessments of various aspects of the device 200. For instance, the sensor component 214 may detect an open/closed status of the device 200, relative positioning of components, e.g., the display and the security keypad, of the device 200, a change in position of the device 200 or a component of the device 200, a presence or absence of user contact with the device 200, an orientation or an acceleration/deceleration of the device 200, and a change in temperature of the device 200. The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate communication, wired or wirelessly, between the device 200 and other devices. The device 200 can access a wireless network based on a communication standard, such as Wi-Fi, 2G, 3G, 4G, 5G, or a combination thereof. In an embodiment, the communication component 216 receives a broadcast signal or broadcast associated information from an external broadcast management system via a broadcast channel. In an embodiment, the communication component 216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 204, executable by the processor 220 in the device 200, for performing the above-described methods. For example, the non-transitory computer-readable storage medium may be a ROM, a RAM, a CD-ROM, a magnetic tape, a floppy disc, an optical data storage device, and the like.

It may be further understood that "a plurality of" in the present disclosure indicates two or more, and other quantifiers are similar thereto. The term "and/or" describes an association relationship for describing associated objects, indicating that three relationships may exist. For example, A and/or B may represent the following three cases: only A exists; both A and B exist; and only B exists. The character "/" generally indicates that the associated objects before and after are in an "or" relationship. The singular forms "a/an", "said", and "the" are also intended to include plural forms, unless otherwise clearly specified in the context.

It may be further understood that the terms such as "first" and "second" are used to describe various information, but the information should not be limited to these terms. These terms are only used to distinguish the same type of information from each other, and do not indicate a specific order or degree of importance. In fact, expressions such as "first" and "second" may be used interchangeably. For example, without departing from the scope of the present disclosure, the first information may also be referred to as second information, and similarly, the second information may also be referred to as first information.

It can be further understood that, unless otherwise specified, "connection" includes the direct connection between the two without other components, and also includes the indirect connection between the two with other components.

It may be further understood that, although the operations are described in a specific order in the drawings in the embodiments of the present disclosure, it should not be understood that the operations are required to be performed in the shown specific order or in a serial order, or all the shown operations are required to be performed to get a desired result. In specific circumstances, multitasking and parallel processing may be advantageous.

Other embodiments of the invention will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A security key verification method for wireless charging, applied to an apparatus to be charged, the apparatus to be charged comprising a processor and a wireless charging receiver, and the security key verification method comprising:
   acquiring, by the apparatus to be charged, a security key of a wireless charging device, and synchronizing, by the apparatus to be charged, the security key to the processor of the apparatus to be charged;
   in response to the wireless charging device sending a security key verification request to the wireless charging receiver of the apparatus to be charged, transmitting, by the wireless charging receiver of the apparatus to be charged, the security key verification request via pass-through to the processor of the apparatus to be charged, and verifying, by the processor of the apparatus to be charged, the security key with the wireless charging device; and
   adding a grade label to the security key of the wireless charging device in response to a success of the security key verification, wherein security keys of different types of wireless charging devices correspond to different grade labels.

2. The security key verification method according to claim 1, wherein acquiring the security key of the wireless charging device comprises at least one of:
   acquiring the security key of the wireless charging device from cloud; or
   acquiring the security key of the wireless charging device locally, wherein the security key of the wireless charging device is synchronized from the cloud to local by the apparatus to be charged in response to a synchronization condition being satisfied,
   wherein the cloud stores security keys of different types of wireless charging devices, and different types of wireless charging devices correspond to different security keys.

3. The security key verification method according to claim 2, wherein the synchronization condition being satisfied comprises at least one of:
the apparatus to be charged establishing a communication connection with the cloud; or
there being a change in the security keys of the wireless charging devices, which are stored in at least one of the apparatus to be charged or the cloud, wherein the change comprises at least one of addition, deletion, or update.

4. The security key verification method according to claim 1, wherein verifying the security key between the processor of the apparatus to be charged and the wireless charging device comprises:
generating a random number by the processor of the apparatus to be charged and sending the random number to the wireless charging device;
acquiring a first encryption security key after the wireless charging device encrypts the security key based on the random number;
encrypting a local security key by the processor of the apparatus to be charged based on the random number and acquiring a second encryption security key; and
verifying the security key based on the first encryption security key and the second encryption security key.

5. The security key verification method according to claim 4, wherein:
the apparatus to be charged locally stores a plurality of security keys of different types of wireless charging devices, which are synchronized from cloud in advance; and
verifying the security key based on the first encryption security key and the second encryption security key comprises:
matching the first encryption security key with a plurality of second encryption security keys one by one, wherein the plurality of second encryption security keys are acquired by encrypting local security keys of the apparatus to be charged based on the random number; and
determining that the security key verification is successful in response to a second encryption security key matching the first encryption security key.

6. A security key verification device for wireless charging, comprising:
a processor; and
a memory configured to store an instruction executable by the processor,
wherein the processor is configured to:
acquire a security key of a wireless charging device and synchronizing the security key to a processor of an apparatus to be charged;
in response to the wireless charging device sending a security key verification request to a wireless charging receiver of the apparatus to be charged, transmit the security key verification request via pass-through from the wireless charging receiver to the processor of the apparatus to be charged, and verify the security key between the processor of the apparatus to be charged and the wireless charging device; and
add a grade label to the security key of the wireless charging device in response to a success of the security key verification, wherein security keys of different types of wireless charging devices correspond to different grade labels.

7. The security key verification device according to claim 6, wherein the processor of the security key verification device is further configured to perform at least one of:
acquiring the security key of the wireless charging device from cloud; or
acquiring the security key of the wireless charging device locally, wherein the security key of the wireless charging device is synchronized from the cloud to local by the apparatus to be charged in response to a synchronization condition being satisfied,
wherein the cloud stores security keys of different types of wireless charging devices, and different types of wireless charging devices correspond to different security keys.

8. The security key verification device according to claim 7, wherein the synchronization condition being satisfied comprises at least one of:
the apparatus to be charged establishing a communication connection with the cloud; or
there being a change in the security keys of the wireless charging devices, which are stored in at least one of the apparatus to be charged and the cloud, wherein the change comprises at least one of addition, deletion, or update.

9. The security key verification device according to claim 6, wherein the processor of the security key verification device is further configured to:
generate a random number by the processor of the apparatus to be charged and send the random number to the wireless charging device;
acquire a first encryption security key after the wireless charging device encrypts the security key based on the random number;
encrypt a local security key by the processor of the apparatus to be charged based on the random number and acquire a second encryption security key; and
verify the security key based on the first encryption security key and the second encryption security key.

10. The security key verification device according to claim 9, wherein the apparatus to be charged locally stores a plurality of security keys of different types of wireless charging devices, which are synchronized from cloud in advance; and
the processor of the security key verification device is further configured to:
match the first encryption security key with a plurality of second encryption security keys one by one, wherein the plurality of second encryption security keys are acquired by encrypting local security keys of the apparatus to be charged based on the random number; and
determine that the security key verification is successful in response to a second encryption security key matching the first encryption security key.

11. A non-transitory computer-readable storage medium having stored therein an instruction that, when executed by a processor of a terminal, causes the processor to implement a security key verification method for wireless charging, wherein the security key verification method comprises:
acquiring a security key of a wireless charging device and synchronizing the security key to a processor of an apparatus to be charged;
in response to the wireless charging device sending a security key verification request to a wireless charging receiver of the apparatus to be charged, transmitting the security key verification request via pass-through from the wireless charging receiver to the processor of the apparatus to be charged, and verifying the security key between the processor of the apparatus to be charged and the wireless charging device; and adding a grade label to the security key of the wireless charging device in response to a success of the security key verification, wherein security keys of different types of wireless charging devices correspond to different grade labels.

12. The storage medium according to claim 11, wherein acquiring the security key of the wireless charging device comprises at least one of:
    acquiring the security key of the wireless charging device from cloud; or
    acquiring the security key of the wireless charging device locally, wherein the security key of the wireless charging device is synchronized from the cloud to local by the apparatus to be charged in response to a synchronization condition being satisfied,
    wherein the cloud stores security keys of different types of wireless charging devices, and different types of wireless charging devices correspond to different security keys.

13. The storage medium according to claim 12, wherein the synchronization condition being satisfied comprises at least one of:
    the apparatus to be charged establishing a communication connection with the cloud; and
    there being a change in the security keys of the wireless charging devices, which are stored in at least one of the apparatus to be charged and the cloud, wherein the change comprises at least one of addition, deletion, or update.

14. The storage medium according to claim 11, wherein verifying the security key between the processor of the apparatus to be charged and the wireless charging device comprises:
    generating a random number by the processor of the apparatus to be charged and sending the random number to the wireless charging device;
    acquiring a first encryption security key after the wireless charging device encrypts the security key based on the random number;
    encrypting a local security key by the processor of the apparatus to be charged based on the random number and acquiring a second encryption security key; and
    verifying the security key based on the first encryption security key and the second encryption security key.

15. The storage medium according to claim 14, wherein:
    the apparatus to be charged locally stores a plurality of security keys of different types of wireless charging devices, which are synchronized from cloud in advance; and
    verifying the security key based on the first encryption security key and the second encryption security key comprises:
    matching the first encryption security key with a plurality of second encryption security keys one by one, wherein the plurality of second encryption security keys are acquired by encrypting local security keys of the apparatus to be charged based on the random number; and
    determining that the security key verification is successful in response to a second encryption security key matching the first encryption security key.

* * * * *